United States Patent
Kang (10) Patent No.: US 12,314,983 B2
(45) Date of Patent: May 27, 2025

(54) METHOD FOR SECURITIZATION OF BATTERY VALUE AND APPARATUS FOR PERFORMING THE METHOD

(71) Applicant: aiZEN Global Co., Inc., Seoul (KR)

(72) Inventor: Jung Seok Kang, Seoul (KR)

(73) Assignee: aiZEN Global Co., Inc., Seoul (KR)

( * ) Notice: Subject to any disclaimer, the term of this patent is extended or adjusted under 35 U.S.C. 154(b) by 305 days.

(21) Appl. No.: 18/050,481

(22) Filed: Oct. 28, 2022

(65) Prior Publication Data

US 2024/0070727 A1    Feb. 29, 2024

(30) Foreign Application Priority Data

Aug. 26, 2022   (KR) .................. 10-2022-0107555

(51) Int. Cl.
  *G06Q 30/00* (2023.01)
  *G06Q 30/02* (2023.01)
  *H02J 7/00* (2006.01)

(52) U.S. Cl.
  CPC ........ *G06Q 30/0278* (2013.01); *H02J 7/0047* (2013.01)

(58) Field of Classification Search
  None
  See application file for complete search history.

(56) References Cited

U.S. PATENT DOCUMENTS

| 2016/0232736 A1* | 8/2016 | Holtappels | H01M 50/514 |
| 2020/0250693 A1* | 8/2020 | Kanamori | G06Q 50/06 |
| 2022/0414780 A1* | 12/2022 | Matsumura | G06Q 40/06 |

FOREIGN PATENT DOCUMENTS

| KR | 20200011391 A | 2/2020 |
| KR | 20200130534 A | 11/2020 |
| KR | 20210055931 A | 5/2021 |
| KR | 20210117109 A | 9/2021 |
| KR | 102414819 B1 | 6/2022 |

OTHER PUBLICATIONS

A Blockchain-Based Privacy-Preserving Payment Mechanism for Vehicle-to-Grid Networks, Gao, Feng; Zhu, Liehuang; Shen, Meng; Sharif, Kashif; Wan, Zhiguo; et al. IEEE Network32.6: 184-192. The Institute of Electrical and Electronics Engineers, Inc. (IEEE). ( 2018) (Year: 2018).*
PreviewOptimal battery pricing under uncertain demand management, He, Yanyi; Sharma, Ratnesh; Bozchalui, Mohammad C.. 2015 IEEE Power and Energy Society Innovative Smart Grid Technologies Conference, ISGT 2015Institute of Electrical and Electronics Engineers Inc. (Jan. 1, 2015) (Year: 2015).*
Electric vehicles: the road ahead, Mckerracher, Colin. Oxford Energy Forum 112: 49. Oxford Institute for Energy Studies. (Mar. 2018) (Year: 2018).*
International Search Report from International Appl. No. PCT/KR2023/012089, dated Nov. 21, 2023.

* cited by examiner

*Primary Examiner* — Matthew T Sittner
(74) *Attorney, Agent, or Firm* — NKL Law; Jae Youn Kim (57) ABSTRACT

A method of securitizing a battery value and an apparatus for performing the method can include evaluating, a battery valuation device, a value of a battery to generate battery value data. The method can further include generating, by a battery value securitization device, a battery transaction unit by securitizing a battery value based on the battery value data; and transacting, by the battery transaction device, the battery transaction unit.

6 Claims, 8 Drawing Sheets

METHOD FOR SECURITIZATION OF BATTERY VALUE AND APPARATUS FOR PERFORMING THE METHOD

CROSS-REFERENCE TO RELATED APPLICATION

This application claims priority to and the benefit of Korean Patent Application No. 10-2022-0107555, filed on Aug. 26, 2022, the disclosure of which is incorporated herein by reference in its entirety.

1. FIELD OF THE INVENTION

The present invention relates to a method of securitizing a battery value and an apparatus for performing the method. More particularly, the present invention relates to a method of securitizing a battery value used in a battery-based driving device such as an electric vehicle and an apparatus for performing the method.

2. DISCUSSION OF RELATED ART

Recently, with the rapid development of electric vehicle-related power electronics and battery technology, interest in the development and supply of electric vehicles that do not emit carbon dioxide is increasing worldwide.

However, there are still several obstacles to the expansion of the spread of electric vehicles. In particular, the energy density of a battery is not yet large enough, and thus it is not possible to satisfactorily increase the driving mileage of an electric vehicle. Therefore, many studies are being actively conducted to increase the charging capacity of a battery by increasing the energy density of the battery. Although batteries of electric vehicles are becoming more and more advanced through research, due to requirements for high safety and high performance of the batteries of the electric vehicles, when the chargeable capacity reaches a critical capacity (e.g., 80%) as compared to a new battery, the battery is regarded as a waste battery and is no longer used in the electric vehicle, and is subject to a disposal procedure.

Disposal of batteries can lead to environmental pollution caused by the chemical substances in the batteries. The disposal of batteries means that enormous resources are wasted nationally, and thus there is a need for sufficient discussion on the reuse of batteries. Further, the batteries discarded from the electric vehicles still have a value corresponding to a residual capacity of about 80%, and thus it is considered that when the batteries are applied to output stabilization of renewable energy, which is an application field that mainly operates at lower requirements than electric vehicles or a current rate (c-rate) of 1 or less, the use of late-night power, or the like, economic feasibility can be sufficiently secured.

Therefore, the value of the reuse of the batteries of the electric vehicles is increasing, and opportunities to generate new and diverse business models including a financial service based on a battery of an electric vehicle can be provided.

In order to reuse the batteries of the electric vehicles, it is important to determine the value of the batteries of the electric vehicles. The determination of the value of the battery of the electric vehicle may be performed by accurately measuring the capacity and performance of the battery through a battery diagnostic test. In addition, when the determined value securitization of the electric vehicle battery enables transaction on the electric vehicle battery, various financial services based on the electric vehicle battery may be provided to users.

SUMMARY OF THE INVENTION

An object of the present invention is to solve all of the above problems.

In addition, the present invention is to provide financial services based on securitization of a battery value.

Further, the present invention is to provide a battery-based financial service by accurately evaluating a battery value based on real-time battery valuation, fragmenting the battery value, and generating the battery value in a plurality of battery transaction units.

According to an aspect of the present invention, there is provided a method of securitizing a battery value, comprises evaluating, a battery valuation device, a value of a battery to generate battery value data; generating, by a battery value securitization device, a battery transaction unit by securitizing a battery value based on the battery value data; and transacting, by the battery transaction device, the battery transaction unit.

Meanwhile, wherein the battery value securitization device determines the battery transaction unit based on the battery value data and financial service data related to a battery owner.

Further, wherein the battery value securitization device generates the battery transaction unit based on a first battery transaction unit setting method or a second battery transaction unit setting method, the first battery transaction unit setting method sets the battery transaction unit based on battery values for each battery and financial services corresponding to the individual battery, and the second battery transaction unit setting method sets a default battery transaction unit for each battery model.

According to another aspect of the present invention, there is provided a system for securitizing a battery for securitization of a battery value, the system comprises a battery valuation device configured to evaluate battery value to generate battery value data; a battery value securitization device configured to generate a battery transaction unit by securitizing a battery value based on the battery value data; and a battery transaction device configured to transact the battery transaction unit.

Meanwhile, wherein the battery value securitization device is configured to determine the battery transaction unit based on the battery value data and financial service data related to a battery owner.

Further, wherein the battery value securitization device is configured to generate the battery transaction unit based on a first battery transaction unit setting method or a second battery transaction unit setting method, the first battery transaction unit setting method sets the battery transaction unit based on battery values for each battery and financial services corresponding to the individual battery, and the second battery transaction unit setting method sets a default battery transaction unit for each battery model.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

The detailed description of the present invention will be made with reference to the accompanying drawings showing examples of specific embodiments of the present invention. These embodiments will be described in detail such that the present invention can be performed by those skilled in the art. It should be understood that various embodiments of the present invention are different but are not necessarily mutually exclusive. For example, a specific shape, structure, and characteristic of an embodiment described herein may be implemented in another embodiment without departing from the scope and spirit of the present invention. In addition, it should be understood that a position or arrangement of each component in each disclosed embodiment may be changed without departing from the scope and spirit of the present invention. Accordingly, there is no intent to limit the present invention to the detailed description to be described below. The scope of the present invention is defined by the appended claims and encompasses all equivalents that fall within the scope of the appended claims. Like reference numerals refer to the same or like elements throughout the description of the figures.

Hereinafter, in order to enable those skilled in the art to practice the present invention, exemplary embodiments of the present invention will be described in detail with reference to the accompanying drawings.

Figure 1:
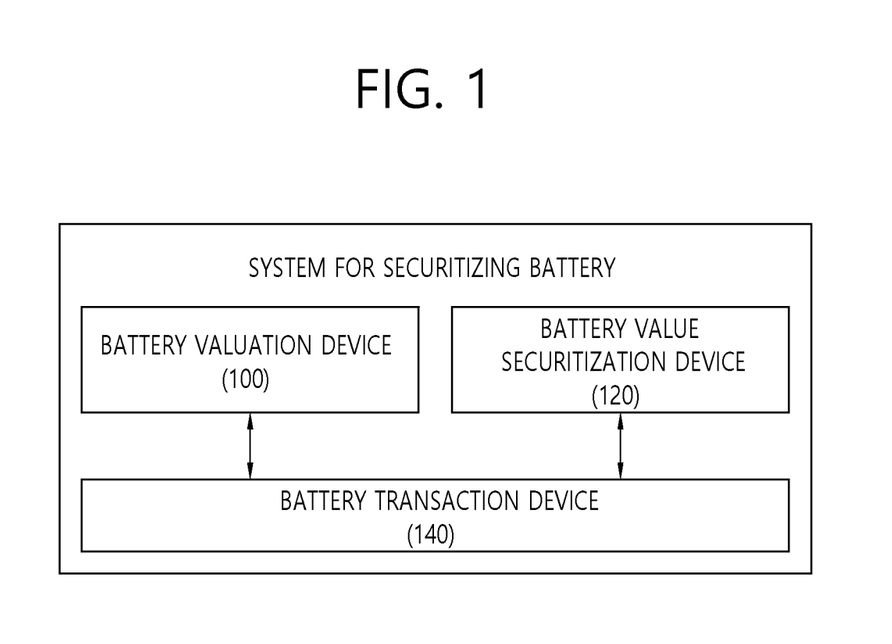
FIG. 1 is a conceptual diagram illustrating a system for securitizing a battery according to an embodiment of the present invention.

FIG. 1 is a conceptual diagram illustrating a system for securitizing a battery according to an embodiment of the present invention.

FIG. 1 illustrates a method of evaluating a battery value in a system for securitizing a battery and securitizing a battery based on the determined battery value.

Referring to FIG. 1, the system for securitizing a battery may include a battery valuation device 100, a battery value securitization device 120, and a battery transaction device 140.

The battery valuation device 100 may be implemented to determine a battery value in real time. The battery valuation device 100 may receive first battery valuation data for battery valuation from a vehicle. In addition, the battery valuation device 100 may receive second battery valuation data for battery valuation from an external server. The battery valuation device 100 may determine battery value data based on the first battery valuation data and the second battery valuation data.

The first battery valuation data is battery valuation data individually generated for each vehicle and may include data individually generated according to vehicle driving, such as vehicle driving data. The second battery valuation data may be received from the external server as battery valuation data that is not individually generated for each vehicle. For example, the second battery valuation data may include data on external factors, which determine a battery value regardless of vehicle driving, such as a change in a battery transaction price, a change in a battery production price, and a change in a raw material price.

The battery value securitization device 120 may be implemented to securitize the battery value based on the battery value data determined by the battery valuation device 100. The battery value securitization device 120 may generate identification information on a battery to identify a battery that is a value securitization target. The battery value securitization device 120 may use various methods of securitizing a battery value after the identification of the battery. The battery value may be transactably securitized in a battery transaction unit through a non-fungible token (NFT)-based asset securitization method, a security token offering (STO)-based asset securitization method, or the like, or may be transactably securitized by fragmenting the battery.

The battery securitized by the battery value securitization device 120 may be divided into battery transaction units. One battery may be divided into one battery transaction unit, or one battery may be fragmented and divided into a plurality of battery transaction units.

The battery value securitization device 120 may securitize the battery value by setting various battery transaction options at the time of transaction. For example, the battery transaction unit may be transacted by setting the transaction option, such as a condition in which battery owners may repurchase the securitized battery transaction unit based on a specific price in the form of a call option of original battery owners.

The battery transaction device 140 may be implemented for transaction in battery transaction units. The battery owners may offer batteries as collateral for battery-based financial services. The battery owners may securitize their batteries in battery transaction units through the battery value securitization device. The battery transaction unit may be transferred to an entity providing a battery-based financial service (e.g., a loan service) based on various media (e.g., digital asset backed security (DABS), NFT, etc.). The battery transaction device 140 may provide secondary transaction for transferring the battery transaction unit, which has been primarily transferred to a vehicle owner, to another trader, and in this way, the battery transaction unit may be able to enable nth transaction on the battery transaction device 140.

The battery transaction device 140 may also perform transaction for transferring the transacted battery transaction unit back to the battery owner according to the termination (e.g., repayment of a loan amount) of the financial service for the battery owner.

Figure 2:
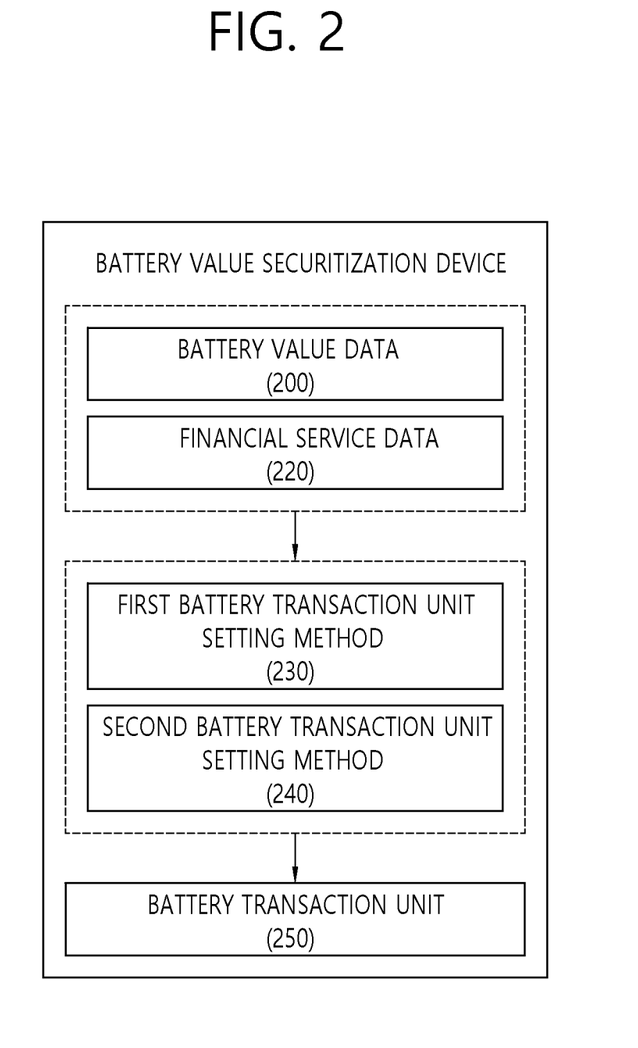
FIG. 2 is a conceptual diagram illustrating a method of securitizing a battery value by a battery value securitization device according to an embodiment of the present invention.

FIG. 2 is a conceptual diagram illustrating a method of securitizing a battery value by a battery value securitization device according to an embodiment of the present invention.

FIG. 2 illustrates a method of setting a battery transaction unit and setting a battery transaction option in the battery value securitization device.

Referring to FIG. 2, the battery value securitization device may provide an option for a battery transaction unit based on information on a battery which is a value securitization target.

The battery value securitization device may determine a battery transaction unit 250 based on battery value data 200 and financial service data 220 desired by a battery owner. The battery value securitization device may determine information on a possible loan limit, a loan interest rate, and a loan term based on a ratio of collateral to a battery value. In other words, various financial service options may be offered to battery owners based on the possible loan limit, the loan interest rate, and the loan term. For example, the first financial service option may be a loan limit of 50 million won, a loan interest rate of 3%, and a loan term of 1 year, and the second financial service option may be a loan limit of 70 million won, a loan interest rate of 4%, and a loan term of 6 months.

A financial service to be provided may be determined by a financial service option selected by a battery owner from among a plurality of financial service options provided by the battery value securitization device.

When a loan amount of a financial service option selected by a battery owner based on a maximum possible loan amount based on a battery value is equal to a maximum possible loan amount, one battery itself may be set as the battery transaction unit 250. When the loan amount of the financial service option selected by the battery owner based on the maximum possible loan amount based on the battery value is smaller than the maximum possible loan amount, the battery may be fragmented based on the loan amount and/or the maximum possible loan amount, so the battery transaction unit 250 may be set.

A first battery transaction unit setting method 230 is to set the battery transaction unit 250 based on battery values for each battery and the financial service corresponding to the individual battery.

For example, when the loan amount is 40 million won and the maximum possible loan amount is 60 million won, only a portion corresponding to ⅔ of the battery may be fragmented, and thus, set as the battery transaction unit 250. Alternatively, considering the maximum possible loan amount and a greatest common divisor (e.g., 20 million won) of the loan amount, a battery is divided into three battery transaction units 250, and two 250 of the three battery transaction units 250 may be delivered to a financial service entity (e.g., an entity providing a loan amount) providing financial services.

A second battery transaction unit setting method 240 is a method of transacting a battery by setting a default battery transaction unit for each battery model. According to an embodiment of the present invention, a default transaction unit of a specific unit for each same battery may be set as the battery transaction unit 250. For example, for Model X battery manufactured by company A, the default battery transaction unit is set in units of 100,000 won, and when the loan amount is 20 million won, 200 battery transaction units may be generated, and thus, delivered to a financial service entity providing financial services.

The first battery transaction unit setting method 230 and the second battery transaction unit setting method 240 may be selectively used in different transaction options. For example, the first battery transaction unit setting method may be used in a first transaction option to be described below, and the second battery transaction unit setting method may be used in a second transaction option to be described below.

Figure 3:
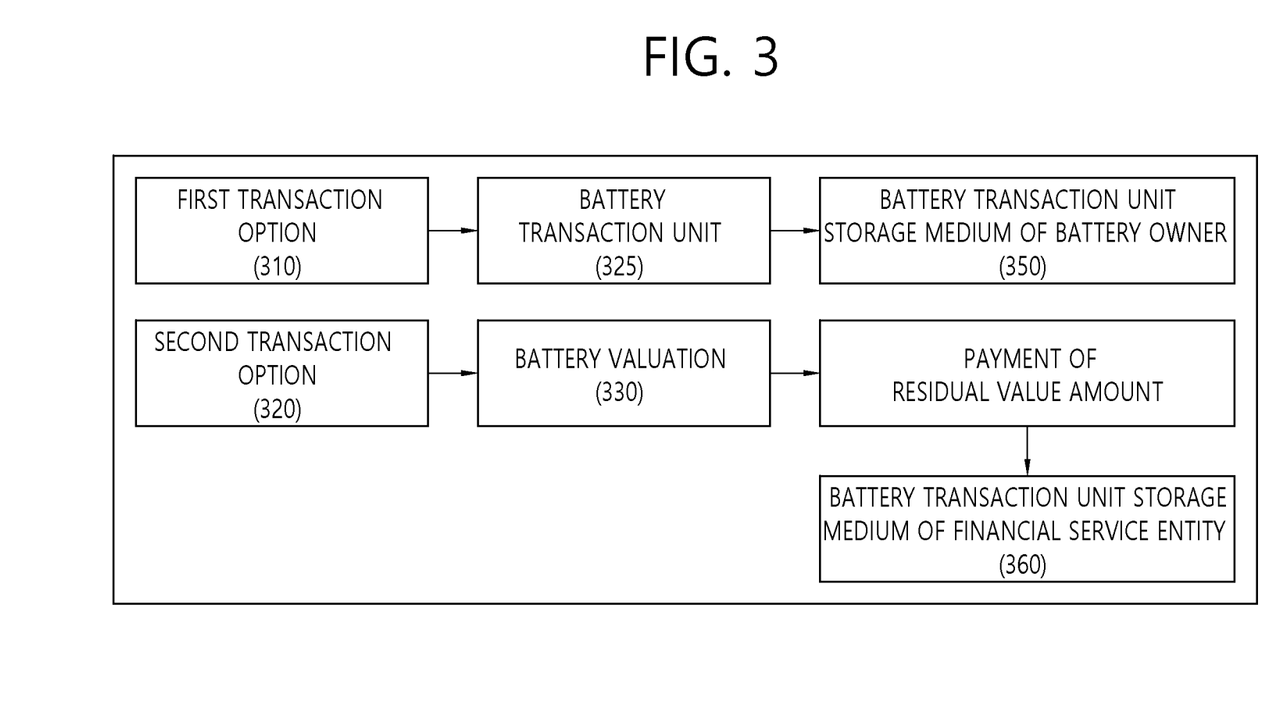
FIG. 3 is a conceptual diagram illustrating a method of transacting a battery by setting an option for battery transaction according to an embodiment of the present invention.

FIG. 3 is a conceptual diagram illustrating a method of transacting a battery by setting an option for battery transaction according to an embodiment of the present invention.

FIG. 3 illustrates a method of setting a battery transaction option in a battery value securitization device.

Referring to FIG. 3, the battery value securitization device may set a battery transaction option according to battery transaction to enable battery transaction.

The battery transaction option may include a first transaction option and a second transaction option. The first transaction option and the second transaction option are examples of one option for transacting the battery transaction unit, and various other transaction options may be used.

The first transaction option may be a transaction option in which a battery can be retrieved again based on a specific amount for his/her own securitized battery transaction unit later when repaying a loan amount.

The second transaction option may be an option in which the battery is not recovered when the loan amount is repaid, a difference is received through valuation at that time, and a right to a battery is transferred to another person.

When the first transaction option is selected, the battery transaction unit may be issued based on NFT. When a loan amount is repaid within a loan period based on a smart contract, the battery transaction unit may be delivered to a battery transaction unit storage medium (e.g., blockchain-based wallet) of an original battery owner.

When the second transaction option is selected, the battery transaction unit may be issued based on the NFT. When the loan amount is repaid within the loan period based on the smart contract, the battery valuation may be performed again at the time of repayment by the battery valuation device. A residual value amount may be determined based on the re-evaluated battery valuation amount and the loan amount. When the residual value amount is paid to the battery owner, the remaining battery transaction unit may be delivered to the battery transaction unit storage media (e.g., blockchain-based wallet) of the financial service entity. In this case, the ownership of the battery may be transferred from the battery owner to the financial service entity.

This transaction option is an example, and the transaction option may be set in various other methods, and this embodiment may also be included in the scope of the present invention.

Figure 4:
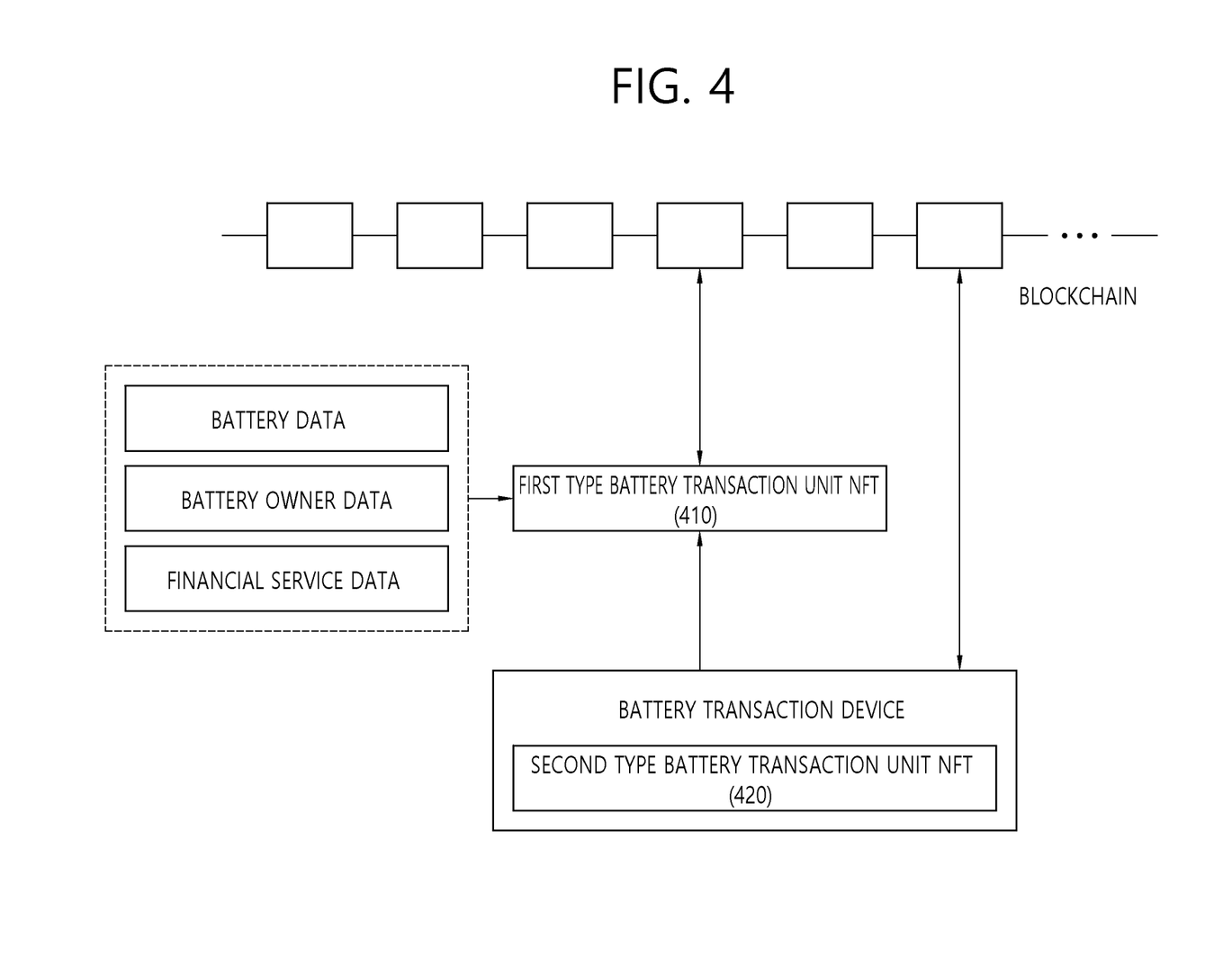
FIG. 4 is a conceptual diagram illustrating a method of managing a battery transaction unit according to an embodiment of the present invention.

FIG. 4 is a conceptual diagram illustrating a method of managing a battery transaction unit according to an embodiment of the present invention.

FIG. 4 illustrates a method of managing a battery transaction unit based on NFT.

Referring to FIG. 4, two types of NFTs may be used to manage the battery transaction unit based on the NFT.

The battery transaction unit may be defined as a first type battery transaction unit NFT 410 for managing a history of the battery transaction unit and a second type battery transaction unit NFT 420 for quick transaction on the battery transaction device of the battery transaction unit. The transactions for the first type battery transaction unit NFT 410 and the second type battery transaction unit NFT 420 may be processed on a blockchain.

When the battery transaction unit is generated, a first type battery transaction unit NFT 410 may be generated based on battery data, battery owner data, financial service data related to the battery owner, and the like.

The first type battery transaction unit NFT 410 may be primarily delivered to a user device of the battery owner. Among the first type battery transaction unit NFTs 410, the first type battery transaction unit NFT 410 secured for financial services may be transferred to a financial service entity when financial services start.

The first type battery transaction unit NFT 410 is NFT for displaying ownership transfer of the first type battery transaction unit NFT 410 other than the previous history and transactions of the battery transaction unit. After the transaction, the first type battery transaction unit NFT 410 may be transferred to a specific entity only when the specific entity has the second type battery transaction unit NFT 420 to be described below for a critical period of time or longer.

The second type battery transaction unit NFT 420 may be generated based on the first type battery transaction unit NFT 410. The second type battery transaction unit NFT 420 is NFT for transaction and may be NFT to be utilized when the frequent transfer of the battery transaction unit occurs due to the transaction.

That is, the frequent transfer of ownership of the battery transaction unit due to the transaction is processed based on the second type battery transaction unit NFT 420, and when the ownership of the battery transaction unit occurs for more than a critical period of time, the transfer history of the battery transaction unit may be managed through the transfer of the first type battery transaction unit NFT 410.

Figure 5:
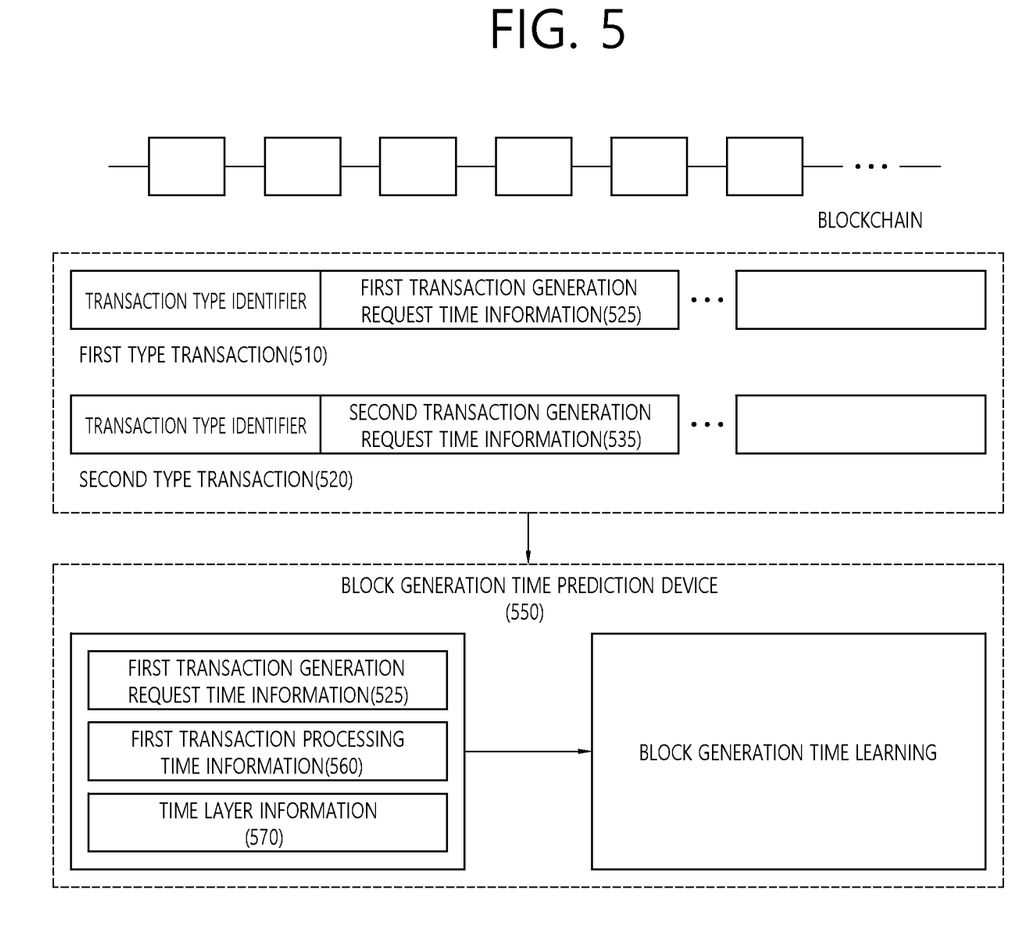
FIG. 5 illustrates a method of transacting a battery transaction unit on a blockchain according to an embodiment of the present invention.

FIG. 5 illustrates a method of transacting a battery transaction unit on a blockchain according to an embodiment of the present invention.

In FIG. 5, a method of adaptively adjusting a block generation time when transacting a battery transaction unit on a blockchain based on NFT is disclosed.

Referring to FIG. 5, a plurality of battery transaction record management nodes may be present to generate blocks on a blockchain.

In the present invention, records of transactions occurring on the blockchain are collected for each time period, and a block generation time can be adaptively determined for each time period based on the transaction records.

The transaction may be classified into two types. A first type transaction 510 may be transaction that is relatively sensitive to a block generation time, and transaction when a quick generation of the first type battery transaction unit NFT is required within a critical time or when a quick generation of the second type battery transaction unit NFT is required within a critical time.

The second type transaction 520 may be a transaction in which the block generation time is relatively insensitive. The second type transaction 520 may be transaction when the generation of the first type battery transaction unit NFT and the generation of the second type battery transaction unit NFT are not required within a critical time.

The block generation time prediction device 550 may predict the block generation time based on the generated transaction. The block generation time prediction device 550 may filter the second type transaction 520 and extract the first type transaction 510 to perform learning for predicting the block generation time.

The first type transaction 510 may include a transaction type identifier indicating the first type transaction 510 and first transaction generation request time information 525 for a time required to generate the first type battery transaction unit NFT or the second type battery transaction unit NFT.

The first transaction generation request time information 525 may include processing request time information that requests the generation of the first type transaction 510, and limit time information that is information on a limit time for requesting delivery of transaction indicating that the transaction cannot be processed when the generation of the first type transaction 510 is impossible until a specific point in time.

The second type transaction 520 may include a transaction type identifier indicating the second type transaction 520 and second transaction generation request time information 535 for a time required to generate the first type battery transaction unit NFT or the second type battery transaction unit NFT.

The second transaction generation request time information 535 may include only limit time information that is information on a limit time for requesting delivery of transaction indicating that the transaction cannot be processed when the generation of the second type transaction 520 is impossible until a specific point in time.

The block generation time prediction device 550 may hierarchically divide the transaction generation time to predict the transaction processing time and perform learning for the volume of transaction generated by time.

The block generation time prediction device 550 may perform learning for predicting a block generation time based on the block generation time when the first type transaction 510 and the second type transaction 515 occurs.

The block generation time prediction device 550 may include the first type transaction 510 and the first type transaction processing time information 560 to perform the learning for predicting the block generation time.

The block generation time prediction device 550 may perform learning based on the first transaction generation request time information 525, and first type transaction processing time information 560, and time layer information 570 that are included in the first type transaction. The time layer information 570 is information in which time units are layered, and may be used to perform block generation in consideration of time sensitivity of block generation time by layering time units.

A first time layer may be a second unit as a smallest time unit, a second time layer may be a minute unit, and a third time layer may be an hour unit. Through the setting of these time layers, learning for a block generation time based on sensitivity in the second unit, learning for a block generation time based on sensitivity in the minute unit, and learning for a block generation time based on sensitivity in the hour unit may be performed.

The block generation time prediction device 550 may set time sensitivity (sensitivity in the second unit, sensitivity in the minute unit, and sensitivity in the hour unit) and may generate a block based on the learned result so that the block generation time is less than or equal to a critical block generation time. For example, when the block generation time prediction device 550 sets the time sensitivity to the sensitivity in the second unit, the block generation time prediction device 550 may generate a block so that the block generation time is less than equal to the critical block generation time in the sensitivity in the second unit.

According to an embodiment of the present invention, the block generation time on the blockchain may be adaptively adjusted, so a battery transaction unit transaction cancellation section may be set. It is possible to cancel the battery transaction unit transaction in the battery transaction unit transaction cancellation section.

The cancellation section may be determined in consideration of the expected block generation time predicted by the block generation time prediction device, and the cancellation section may be adaptively changed according to the time when the transaction of the battery transaction unit occurs and the block generation time.

Figure 6:
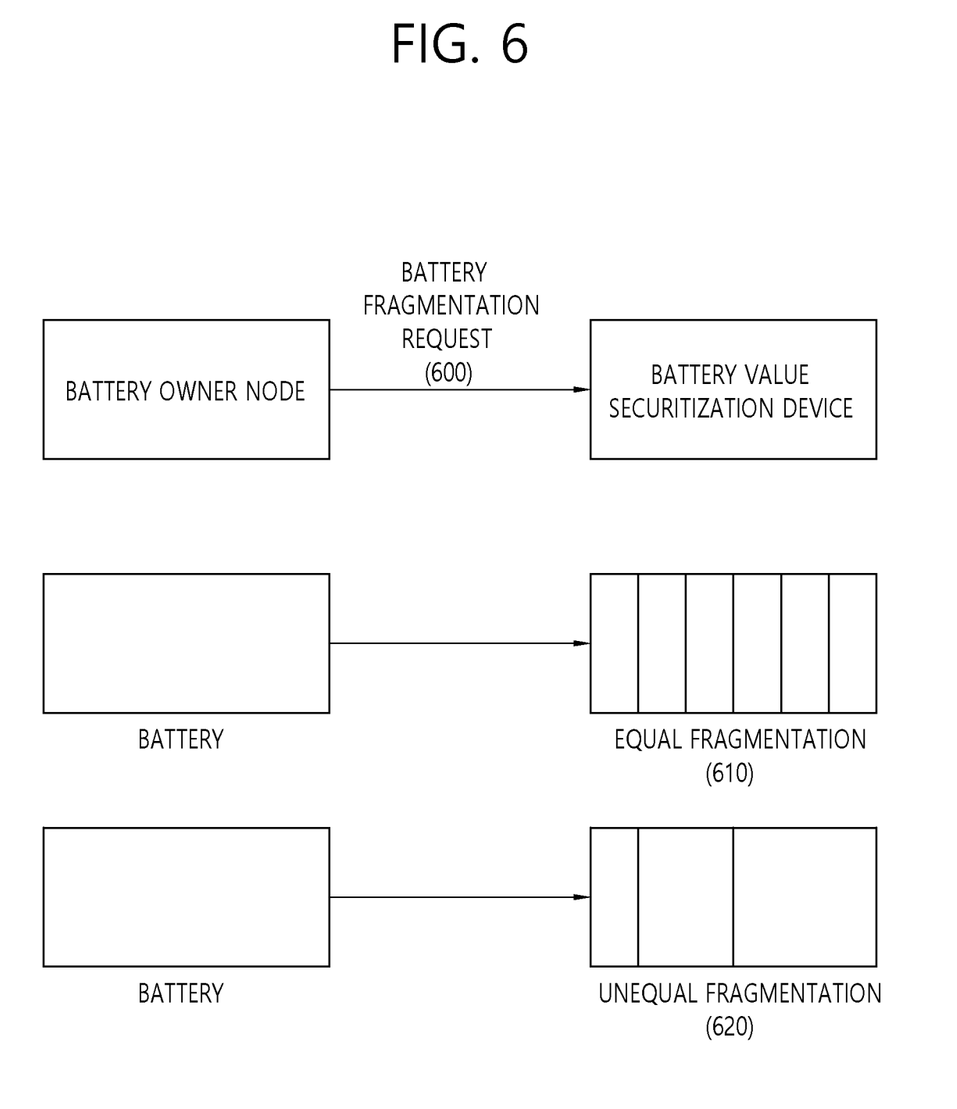
FIG. 6 is a conceptual diagram illustrating a method of transacting battery fragmentation according to an embodiment of the present invention.

FIG. 6 is a conceptual diagram illustrating a method of transacting battery fragmentation according to an embodiment of the present invention.

FIG. 6 illustrates a specific method of battery fragmentation transaction for transacting a fragmented battery transaction unit.

Referring to FIG. 6, fragmentation of tokenized batteries may be performed to divide and transact tokenized batteries on a blockchain.

The battery value securitization device may receive a battery fragmentation request 600 for primarily tokenizing a battery as a transaction target and fragmenting the tokenized battery from a battery owner device (or battery owner node) holding the tokenized battery.

The battery fragmentation request 600 may include a target battery as a fragmentation target and fragmentation information. The fragmentation information may include information generated when a battery is fragmented, such as information on equal fragmentation 610, unequal fragmentation 620, a fragmentation ratio, and price of a battery transaction unit after fragmentation.

The equal fragmentation 610 is to fragment a battery at equal prices.

The unequal fragmentation 620 is to fragment a battery at unequal prices.

The fragmentation ratio relates to a ratio at which a battery is fragmented.

The battery price after fragmentation relates to the price of the battery transaction unit after fragmentation.

When the fragmentation is performed, the fragmentation request transaction is transmitted to the blockchain, and the battery may be fragmented based on a smart contract according to the fragmentation request transaction. The battery transaction unit, which is a fragmented battery, may be NFT in which information on a target battery and fragmentation information are matched and to which fragmented battery identification information is assigned. The fragmentation battery identification information may be generated by considering a hash value generated by performing primary hashing based on the battery identification information.

The battery transaction unit may be transacted individually, or a plurality of battery transaction units may be combined and transacted. When the battery transaction units are individually transacted, the transaction may be performed based on the fragmentation battery identification information of the battery transaction unit, and when the plurality of battery transaction units are combined and transacted, new fragmentation battery identification information to which a hash value generated by performing secondary hashing based on each of the plurality of pieces of fragmentation battery identification information is assigned may be transacted.

A primarily fragmented battery transaction unit may be expressed in terms of a primary fragmentation battery transaction unit. As in the case where the primary fragmentation battery transaction unit is additionally fragmented, or the primary fragmentation transaction units are combined and then fragmented again, the battery transaction unit is generated by being fragmented once again, which may be expressed in terms of a secondary fragmentation battery transaction unit. In this way, an nth fragmented battery transaction unit may be generated through nth hashing, and the records for the previous tokenized battery and the previous fragmentation battery transaction unit may be hashed and preserved in the nth fragmented battery transaction unit.

Figure 7:
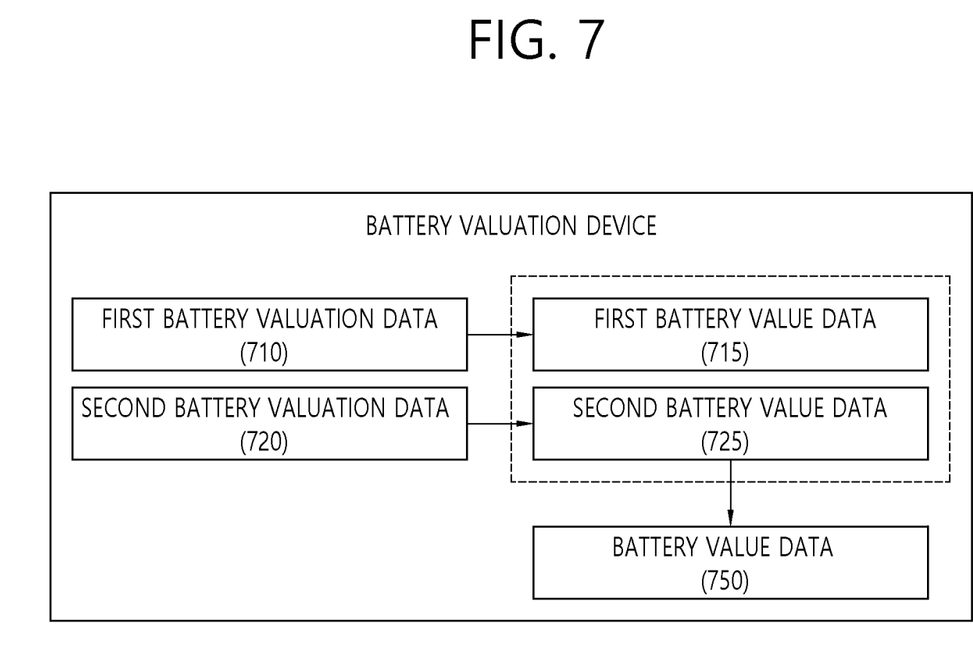
FIG. 7 is a conceptual diagram illustrating a method of evaluating, by a battery value evaluation server, a battery value according to an embodiment of the present invention.

FIG. 7 is a conceptual diagram illustrating a method of evaluating, by a battery value evaluation server, a battery value according to an embodiment of the present invention.

In FIG. 7, a method of evaluating a battery value, in which the battery value is evaluated based on first battery value evaluation data and second battery value evaluation data, is disclosed.

Referring to FIG. 7, the battery value evaluation server may receive first battery value evaluation data 710 and second battery value evaluation data 720 and generate battery value data 750 in real time based on the first battery value evaluation data 710 and the second battery value evaluation data 720.

The battery value evaluation server may generate first battery value data 715 based on the first battery value evaluation data 710 and generate second battery value data 725 based on the second battery value evaluation data 720.

The first battery value data 715 may be determined for an individual vehicle and the second battery value data 725 may be determined for a vehicle group related to the second battery value evaluation data 720.

In order to finally determine the battery value data 750 by reflecting the first battery value data 715 and the second battery value data 725, the first battery value data 715 may be determined, and then an additional value correction procedure, in which the second battery value data 725 is considered, may be performed.

That is, the first battery value data 715 may be firstly determined with vehicle driving data of an individual vehicle, and then the additional value correction procedure, in which the second battery value data 725 based on external factors such as a current transaction price, raw material supply and demand, and the like is considered, may be performed.

Figure 8:
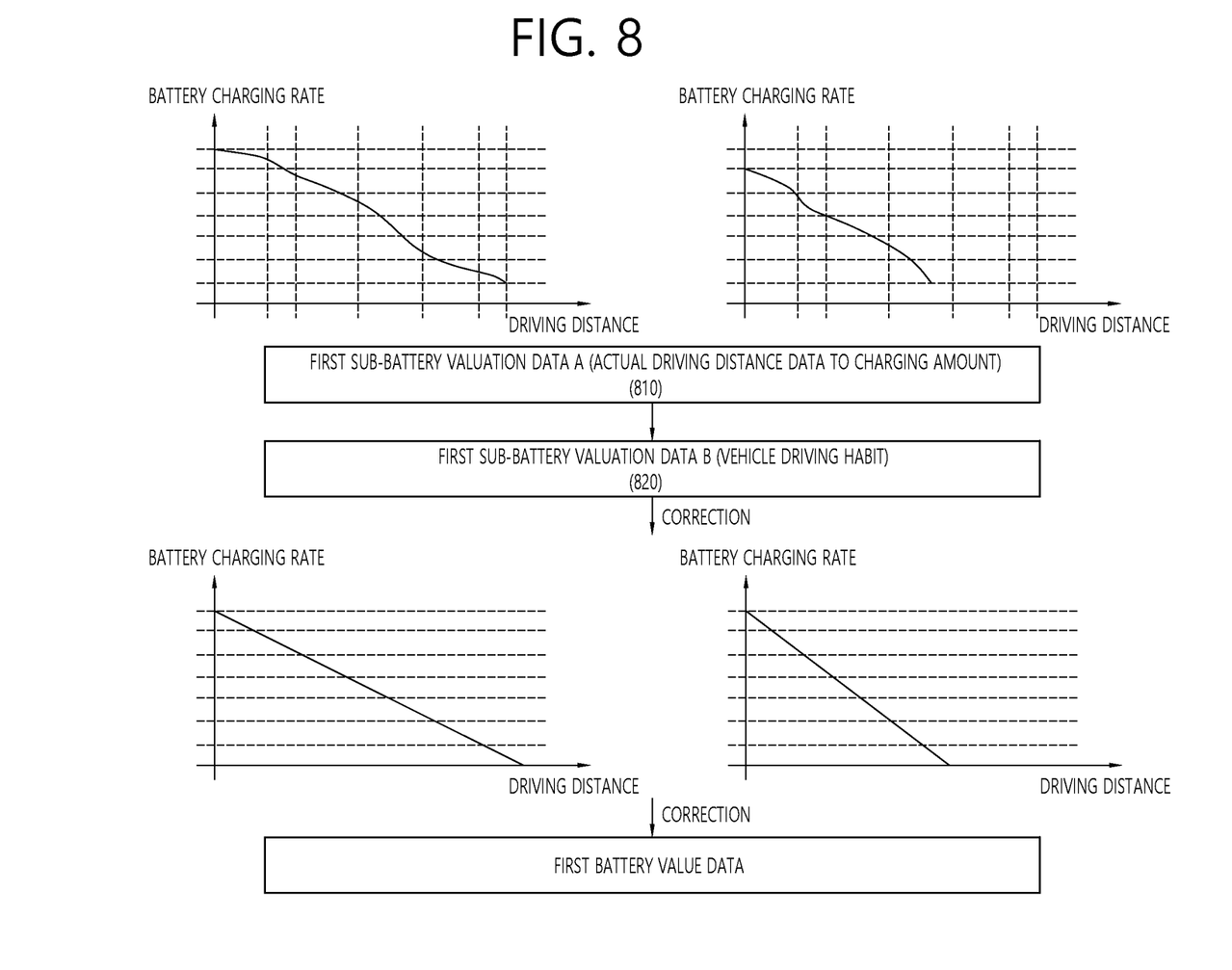
FIG. 8 is a conceptual diagram illustrating a method of determining first battery value data according to an embodiment of the present invention.

FIG. 8 is a conceptual diagram illustrating a method of determining first battery value data according to an embodiment of the present invention.

In FIG. 8, a method of determining first battery value data based on vehicle driving data of an individual vehicle is disclosed.

Referring to FIG. 8, the first battery value data may be determined based on the vehicle driving data collected from the vehicle in real time. The vehicle driving data may include a plurality of pieces of subordinate vehicle driving data as a plurality of pieces of first subordinate battery value evaluation data, and the plurality of pieces of first subordinate battery value evaluation data may be grouped according to the characteristics of the data and used to determine the first battery value data.

That is, the first battery value evaluation data used to determine the first battery value data may include the plurality of pieces of first subordinate battery value evaluation data (including first subordinate battery value evaluation data A (810) and first subordinate battery value evaluation data B (820)).

First, data on an actual driving mileage relative to an amount of charge of the vehicle may be collected as the first subordinate battery value evaluation data A (810).

For example, when an electric vehicle having a battery with a capacity of 80 kWh is present, data on how far the vehicle can travel (driving mileage) at a charging rate (e.g., 80%) may be collected. The actual driving mileage relative to the amount of charge of the vehicle may be collected as data that can most intuitively represent a degradation state of the battery. The charging rate may be changed for each charging, and the charging rate at which charging is performed may also be changed.

Data on a vehicle driving habit may be collected as the first subordinate battery value evaluation data B. The data on the vehicle driving habit may include data on a change in acceleration, a change in speed, a driving route, etc. of the vehicle that occur during driving. Specifically, in the vehicle which becomes a target of battery value evaluation, information that may affect battery discharge, such as charging state information, driving route information, speed change information, acceleration change information, external environment information, etc. of the vehicle, may be collected as the first subordinate battery value evaluation data B (820).

The driving mileage that the vehicle can travel may be changed even with a battery having the same performance depending on the vehicle driving habit. The first subordinate battery value evaluation data A (810) may be corrected based on the first subordinate battery value evaluation data B (820) to determine the first battery value data.

The first battery value data may be determined based on the first subordinate battery value evaluation data A (810) and the first subordinate battery value evaluation data B (820) which are collected for each individual vehicle. The first subordinate battery value evaluation data A (810) may be determined for each individual vehicle, and the first subordinate battery value evaluation data B (820) may be collected and determined for a vehicle driving group instead of the individual vehicle.

The first subordinate battery value evaluation data A (810), which is the actual driving mileage relative to the amount of charge, may be corrected based on the subordinate battery value evaluation data B (820) to determine the first battery value data. A battery value determination graph that is determined by correcting the first subordinate battery value evaluation data A (810) based on the subordinate battery value evaluation data B (820) may include information on a driving mileage that the vehicle can travel after the battery is fully charged to 100% under preset driving conditions and until the battery is discharged to 0%. The battery value may be determined based on the battery value determination graph, and the first battery value data may be determined.

According to an embodiment of the present invention, the battery value determination graph may be partially changed every time the vehicle is driven, and accordingly, the first battery value data may be changed. Therefore, in the present invention, in order to reduce errors, current first battery value data may be determined by combining pieces of previously determined first battery value data. The battery value should be reduced with use, and when a battery value based on the previous first battery value data is greater than a battery value based on the current first battery value data, the corresponding first battery value data is not used to determine the battery value data and may be preferentially extracted as exception data. After being extracted as the exception data, when exception data of a critical number of times or more and first battery value data within a critical range is generated to be adjacent to the exception data, the first battery value data corresponding to the exception data, the exception data that is generated the critical number of times or more, and the first battery value data within the critical range may be reflected again as values for determining the battery value data and used to determine the battery value data. Conversely, after being extracted as the exception data, when exception data of a critical number of times or more and first battery value data within a critical range is not generated to be adjacent to the exception data, the first battery value data corresponding to the exception data may be discarded.

The embodiments of the present invention described above may be implemented in the form of program instructions that can be executed through various computer units and recorded on computer readable media. The computer readable media may include program instructions, data files, data structures, or combinations thereof. The program instructions recorded on the computer readable media may be specially designed and prepared for the embodiments of the present invention or may be available instructions well known to those skilled in the field of computer software. Examples of the computer readable media include magnetic media such as a hard disk, a floppy disk, and a magnetic tape, optical media such as a compact disc read only memory (CD-ROM) and a digital video disc (DVD), magneto-optical media such as a floptical disk, and a hardware device, such as a ROM, a RAM, or a flash memory, that is specially made to store and execute the program instructions. Examples of the program instruction include machine code generated by a compiler and high-level language code that can be executed in a computer using an interpreter and the like. The hardware device may be configured as at least one software module in order to perform operations of embodiments of the present invention and vice versa.

While the present invention has been described with reference to specific details such as detailed components, specific embodiments and drawings, these are only examples to facilitate overall understanding of the present invention and the present invention is not limited thereto. It will be understood by those skilled in the art that various modifications and alterations may be made.

Therefore, the spirit and scope of the present invention are defined not by the detailed description of the present invention but by the appended claims, and encompass all modifications and equivalents that fall within the scope of the appended claims.

What is claimed is:

1. A method of securitizing a battery value, comprising:
    evaluating, by a battery valuation device, a value of a battery to generate battery value data;
    generating, by a battery value securitization device, a battery transaction unit by securitizing the battery value based on the battery value data; and
    transacting, by a battery transaction device, the battery transaction unit,
    wherein the battery transaction unit comprises a first type battery transaction unit and a second type battery transaction unit, the first and second type battery transaction units being non-fungible tokens (NFTs) and configured to be processed on a blockchain,
    wherein the first type battery unit is configured to display an ownership transfer of the battery, and the first type battery unit is transferred to an entity when the entity has the second type battery unit for a predetermined time or longer,
    wherein the second type battery unit is configured to display a transaction history,
    wherein a plurality of battery transaction record management nodes is prepared for generating blocks on the blockchain, records of transactions occurring on the blockchain are collected for each time period, and a block generation time is adaptively determined based on the transaction records and adjusted when the transacting of the battery transaction unit is performed, wherein a block generation time prediction device performs learning for predicting the block generation time based on a first type transaction which includes first transaction generation request time information and a second type transaction which includes second transaction generation request time information, wherein the first type transaction is a transaction which requires a quick generation of the first or second type battery transaction unit within a critical time, and the second type transaction is a transaction which does not require the quick generation of the first or second type battery transaction unit within the critical time, wherein the block generation time prediction device filters the second type transaction and extract the first type transaction to perform the learning for predicting the block generation time, the method further comprising: setting a sensitivity time of the block generation time prediction device such that the block generation time is equal to or less than a critical block generation time of the set sensitivity time, wherein the block generation time on the blockchain is adaptively adjusted such that a battery transaction unit transaction cancellation section is set, the battery transaction unit transaction cancellation section is determined based on an expected block generation time predicted by the block generation time prediction device, and the battery transaction unit transaction cancellation section is adaptively adjusted according to a time when the transaction of the battery transaction unit occurs and the block generation time, wherein, when the transacting of the battery transaction unit is performed, a price thereof is determined by fragmentation of a target battery, and information on the target battery and fragmentation information are matched to the battery transaction unit such that fragmentation battery identification information is assigned, wherein a primary hashing value of the fragmentation battery identification information is generated by performing primary hashing based on battery identification information, and wherein a subsequent hashing value of the fragmentation battery identification information is further generated by performing subsequent hashing based on the fragmentation battery identification information including a plurality of battery units combined and transacted.

2. The method of claim 1, wherein the battery value securitization device determines the battery transaction unit based on the battery value data and financial service data related to a battery owner.

3. The method of claim 2, wherein the battery value securitization device generates the battery transaction unit based on a first battery transaction unit setting method or a second battery transaction unit setting method, the first battery transaction unit setting method sets the battery transaction unit based on the battery value and financial services corresponding to the battery, and the second battery transaction unit setting method sets a default battery transaction unit for a battery model.

4. A system for securitizing a battery for securitization of a battery value, the system comprising:

a battery valuation device configured to evaluate a battery value to generate battery value data;

a battery value securitization device configured to generate a battery transaction unit by securitizing the battery value based on the battery value data; and a battery transaction device configured to transact the battery transaction unit, wherein the battery transaction unit comprises a first type battery transaction unit and a second type battery transaction unit, the first and second type battery transaction units being non-fungible tokens (NFTs) and configured to be processed on a blockchain, wherein the first type battery unit is configured to display an ownership transfer of the battery, and the first type battery unit is transferred to an entity when the entity has the second type battery unit for a predetermined time or longer, wherein the second type battery unit is configured to display a transaction history, wherein a plurality of battery transaction record management nodes is prepared for generating blocks on the blockchain, records of transactions occurring on the blockchain are collected for each time period, and a block generation time is adaptively determined based on the transaction records and adjusted when a transaction of the battery transaction unit is performed, wherein a block generation time prediction device performs learning for predicting the block generation time based on a first type transaction which includes first transaction generation request time information and a second type transaction which includes second transaction generation request time information, wherein the first type transaction is a transaction which requires a quick generation of the first or second type battery transaction unit within a critical time, and the second type transaction is a transaction which does not require the quick generation of the first or second type battery transaction unit within the critical time, wherein the block generation time prediction device filters the second type transaction and extract the first type transaction to perform the learning for predicting the block generation time, wherein the block generation time device is configured to set a sensitivity time such that the block generation time is equal to or less than a critical block generation time of the set sensitivity time, wherein the block generation time on the blockchain is adaptively adjusted such that a battery transaction unit transaction cancellation section is set, the battery transaction unit transaction cancellation section is determined based on an expected block generation time predicted by the block generation time prediction device, and the battery transaction unit transaction cancellation section is adaptively adjusted according to a time when the transaction of the battery transaction unit occurs and the block generation time, wherein, when the transaction of the battery transaction unit is performed, a price thereof is determined by fragmentation of a target battery, and information on the target battery and fragmentation information are matched to the battery transaction unit such that fragmentation battery identification information is assigned, wherein a primary hashing value of the fragmentation battery identification information is generated by performing primary hashing based on battery identification information, and wherein a subsequent hashing value of the fragmentation battery identification information is further generated by performing subsequent hashing based on the fragmentation battery identification information including a plurality of battery units combined and transacted.

5. The system of claim 4, wherein the battery value securitization device is configured to determine the battery transaction unit based on the battery value data and financial service data related to a battery owner.

6. The system of claim 5, wherein the battery value securitization device is configured to generate the battery transaction unit based on a first battery transaction unit setting method or a second battery transaction unit setting method, the first battery transaction unit setting method sets the battery transaction unit based on the battery value and financial services corresponding to the battery, and the second battery transaction unit setting method sets a default battery transaction unit for a battery model.

* * * * *